United States Patent
Hale et al.

(10) Patent No.: US 8,458,118 B1
(45) Date of Patent: Jun. 4, 2013

(54) DYNAMIC CONFIGURATION FOR NETWORKED IMAGING DEVICES

(75) Inventors: Gordon L. Hale, Renton, WA (US); Rudy Charles Wells, Kent, WA (US)

(73) Assignee: The Boeing Company, Chicago, IL (US)

( * ) Notice: Subject to any disclaimer, the term of this patent is extended or adjusted under 35 U.S.C. 154(b) by 275 days.

(21) Appl. No.: 12/725,246

(22) Filed: Mar. 16, 2010

(51) Int. Cl.
*G06F 7/00* (2006.01)
*G06F 17/00* (2006.01)

(52) U.S. Cl.
USPC ............ 707/603; 707/607; 709/220; 709/222

(58) Field of Classification Search
USPC .................. 709/245, 224, 220, 222; 707/603, 707/607, 784
See application file for complete search history.

(56) References Cited

U.S. PATENT DOCUMENTS

| | | | |
|---|---|---|---|
| 6,370,147 B1 | 4/2002 | Beser | |
| 6,466,986 B1 * | 10/2002 | Sawyer et al. | 709/245 |
| 7,114,070 B1 * | 9/2006 | Willming et al. | 713/156 |
| 7,385,966 B2 * | 6/2008 | Monteiro et al. | 370/356 |
| 2004/0093408 A1 * | 5/2004 | Hirani et al. | 709/224 |
| 2010/0082779 A1 * | 4/2010 | Min | 709/220 |

FOREIGN PATENT DOCUMENTS

WO 03102801 A1 12/2003

OTHER PUBLICATIONS

Beser et al., "Dynamic Host Configuration Protocol (DHCP) Option for CableLabs Client Configuration" RFC3495, Mar. 2003, pp. 1-10 www.faqs.org/rfcs/rfc3495.html.
EPO Search Report for application GB1104044.1 dated Jul. 8, 2011.

* cited by examiner

*Primary Examiner* — Vincent Boccio
(74) *Attorney, Agent, or Firm* — Yee & Associates, P.C.

(57) ABSTRACT

The different advantageous embodiments provide a dynamic configuration system comprising a number of networks, a number of imaging devices, and a dynamic host configuration protocol server. The dynamic host configuration protocol server is configured to execute a dynamic configuration process to place the number of imaging devices into the number of networks.

16 Claims, 5 Drawing Sheets

DYNAMIC CONFIGURATION FOR NETWORKED IMAGING DEVICES

BACKGROUND INFORMATION

1. Field

The present disclosure relates generally to networked devices and more particularly to a data processing system for configuration of imaging devices within a network. Still more particularly, the present disclosure relates to dynamic configuration for networked imaging devices.

2. Background

Many companies maintain robust corporate intranets with many different networked imaging devices. Imaging devices such as printers, copiers, and facsimile machines may be distributed throughout a work environment and accessed by end users over a network. When a new imaging device is installed, networking information for the new device must be configured in order to properly insert the new device into the appropriate network. End users typically do not have access to a device until it is properly installed and configured for access over the network.

Some imaging devices are statically configured by a manual process for insert into the appropriate network, while newer imaging devices work with the dynamic host configuration protocol (DHCP). The static devices must be manually configured individually, which is time-consuming and error-prone. Also, these devices must be manually reconfigured every time the network topology changes. The dynamic host configuration protocol is a protocol used by clients to retrieve internet protocol address assignments and other configuration information from a server. The client, such as an imaging device for example, sends a broadcast request for configuration information to a dynamic host configuration protocol server. The server receives the request and responds with configuration information. The installation process requires the printer installation technician to inform other departments of the printer's asset and location information for proper documentation.

Therefore, it is advantageous to have a method and apparatus that takes into account one or more of the issues discussed above, as well as possibly other issues.

SUMMARY

The different advantageous embodiments provide a dynamic configuration system comprising a number of networks, a number of imaging devices, and a dynamic host configuration protocol server. The dynamic host configuration protocol server is configured to execute a dynamic configuration process to place the number of imaging devices into the number of networks.

The different advantageous embodiments further provide a method for dynamically configuring an imaging device. A request is received from an imaging device at a server. An offer is generated by the server having an IP address, IP address lease, subnet mask, a pair of dynamic name servers (DNS) and gateway. The offer is transmitted to the imaging device. An acceptance of the offer is received from the imaging device.

The different advantageous embodiments further provide a method for device management. An imaging device is detected using a dynamic host configuration protocol server. An IP address is selected for the imaging device. An IP address lease is assigned to the IP address for the imaging device. The imaging device's host name is placed into the domain name server. The IP address lease and domain name for the imaging device is recorded in an IP database. An asset tag is applied to the imaging device. The imaging device is assigned a device name using the asset tag applied. The IP address, asset tag and the device domain name are recorded in a database.

The different advantageous embodiments further provide a dynamic configuration system comprising a number of networks, a number of imaging devices, and a dynamic host configuration protocol server. The dynamic host configuration protocol server is configured to execute a dynamic configuration process to place the number of imaging devices into the number of networks.

The features, functions, and advantages can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the advantageous embodiments are set forth in the appended claims. The advantageous embodiments, however, as well as a preferred mode of use, further objectives and advantages thereof, will best be understood by reference to the following detailed description of an advantageous embodiment of the present disclosure when read in conjunction with the accompanying drawings, wherein:

DETAILED DESCRIPTION

Figure 1:
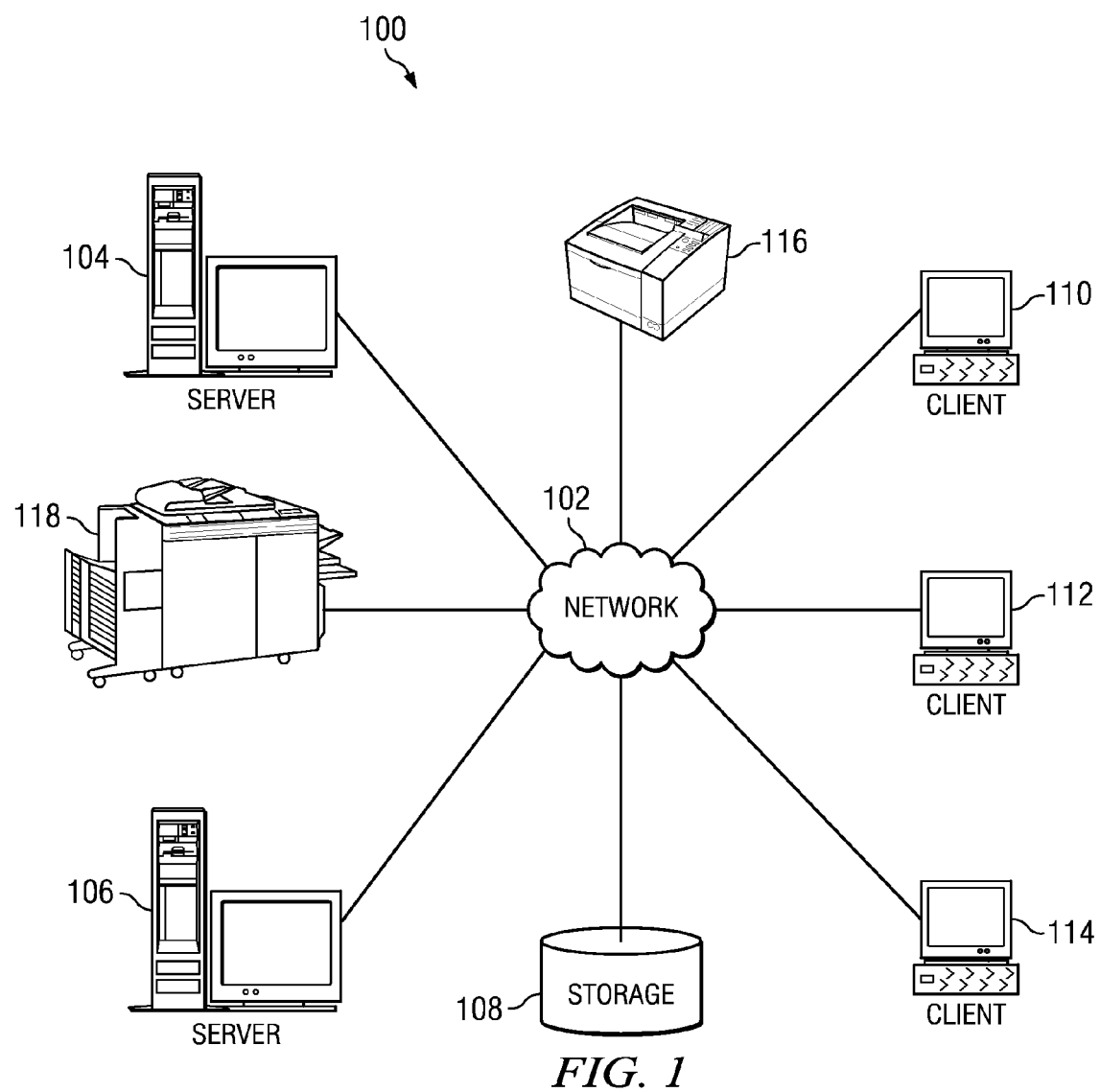
FIG. 1 is an illustration of a network of data processing systems in accordance with an advantageous embodiment.

With reference now to the figures and in particular with reference to FIG. 1, an illustrative diagram of a network of data processing systems is provided in which illustrative embodiments may be implemented. It should be appreciated that FIG. 1 is only provided as an illustration of one implementation and is not intended to imply any limitation with regard to the environments in which different embodiments may be implemented. Many modifications to the depicted environments may be made.

FIG. 1 is an illustrative example of a network of data processing systems in accordance with an advantageous embodiment. Network data processing system 100 is a network of computers in which the illustrative embodiments may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. Clients 110, 112, and 114 may be, for example, personal computers or network computers. In this illustrative example, imaging device 116 and imaging device 118 also connect to network 102. Imaging device 116 and imaging device 118 may be, for example, without limitation, a printer, scanner, copier, facsimile machine, and/or any other suitable imaging device.

In the depicted example, server 104 provides information, such as boot files, operating system images, and applications to clients 110, 112, and 114. Clients 110, 112, and 114 are clients to server 104 in this example. Network data processing system 100 may include additional servers, clients, and other devices not shown.

Program code located in network data processing system 100 may be stored on a computer recordable storage medium and downloaded to a data processing system or other device for use. For example, program code may be stored on a computer recordable storage medium on server 104 and downloaded to client 110 over network 102 for use on client 110.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the different illustrative embodiments.

Figure 2:
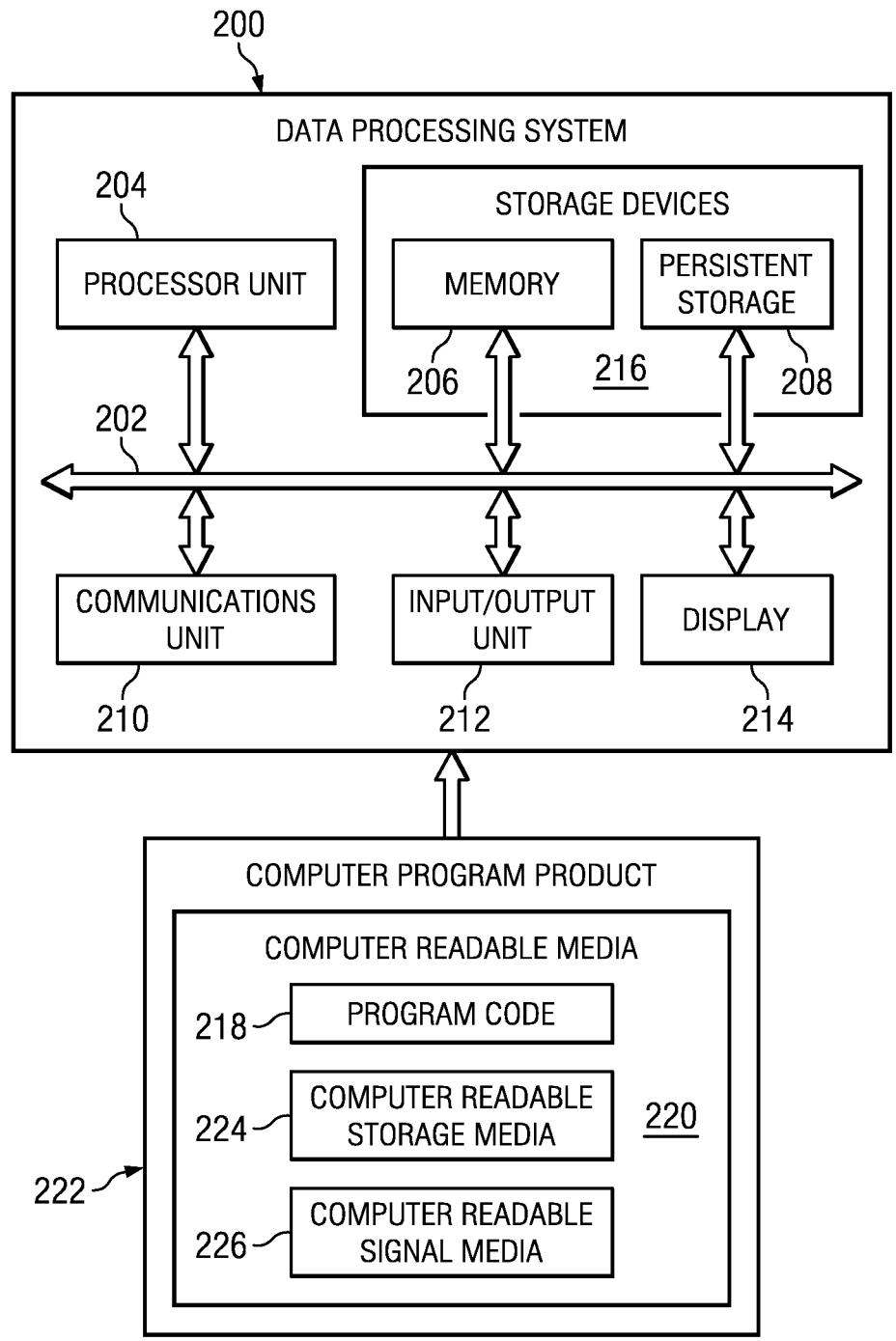
FIG. 2 is an illustration of a data processing system in accordance with an advantageous embodiment.

Turning now to FIG. 2, an illustration of a data processing system is depicted in accordance with an advantageous embodiment. In this illustrative example, data processing system 200 includes communications fabric 202, which provides communications between processor unit 204, memory 206, persistent storage 208, communications unit 210, input/output (I/O) unit 212, and display 214.

Processor unit 204 serves to execute instructions for software that may be loaded into memory 206. Processor unit 204 may be a set of one or more processors or may be a multi-processor core, depending on the particular implementation. Further, processor unit 204 may be implemented using one or more heterogeneous processor systems, in which a main processor is present with secondary processors on a single chip. As another illustrative example, processor unit 204 may be a symmetric multi-processor system containing multiple processors of the same type.

Memory 206 and persistent storage 208 are examples of storage devices 216. A storage device is any piece of hardware that is capable of storing information, such as, for example, without limitation, data, program code in functional form, and/or other suitable information either on a temporary basis and/or a permanent basis. Memory 206, in these examples, may be, for example, a random access memory, or any other suitable volatile or non-volatile storage device. Persistent storage 208 may take various forms, depending on the particular implementation. For example, persistent storage 208 may contain one or more components or devices. For example, persistent storage 208 may be a hard drive, a flash memory, a rewritable optical disk, a rewritable magnetic tape, or some combination of the above. The media used by persistent storage 208 may be removable. For example, a removable hard drive may be used for persistent storage 208.

Communications unit 210, in these examples, provides for communication with other data processing systems or devices. In these examples, communications unit 210 is a network interface card. Communications unit 210 may provide communications through the use of either or both physical and wireless communications links.

Input/output unit 212 allows for the input and output of data with other devices that may be connected to data processing system 200. For example, input/output unit 212 may provide a connection for user input through a keyboard, a mouse, and/or some other suitable input device. Further, input/output unit 212 may send output to a printer. Display 214 provides a mechanism to display information to a user.

Instructions for the operating system, applications, and/or programs may be located in storage devices 216, which are in communication with processor unit 204 through communications fabric 202. In these illustrative examples, the instructions are in a functional form on persistent storage 208. These instructions may be loaded into memory 206 for execution by processor unit 204. The processes of the different embodiments may be performed by processor unit 204 using computer implemented instructions, which may be located in a memory, such as memory 206.

These instructions are referred to as program code, computer usable program code, or computer readable program code that may be read and executed by a processor in processor unit 204. The program code, in the different embodiments, may be embodied on different physical or computer readable storage media, such as memory 206 or persistent storage 208.

Program code 218 is located in a functional form on computer readable media 220 that is selectively removable and may be loaded onto or transferred to data processing system 200 for execution by processor unit 204. Program code 218 and computer readable media 220 form computer program product 222. In one example, computer readable media 220 may be computer readable storage media 224 or computer readable signal media 226. Computer readable storage media 224 may include, for example, an optical or magnetic disc that is inserted or placed into a drive or other device that is part of persistent storage 208 for transfer onto a storage device, such as a hard drive, that is part of persistent storage 208. Computer readable storage media 224 also may take the form of a persistent storage, such as a hard drive, a thumb drive, or a flash memory that is connected to data processing system 200. In some instances, computer readable storage media 224 may not be removable from data processing system 200.

Alternatively, program code 218 may be transferred to data processing system 200 using computer readable signal media 226. Computer readable signal media 226 may be, for example, a propagated data signal containing program code 218. For example, computer readable signal media 226 may be an electro-magnetic signal, an optical signal, and/or any other suitable type of signal. These signals may be transmitted over communications links, such as wireless communications links, an optical fiber cable, a coaxial cable, a wire, and/or any other suitable type of communications link. In other words, the communications link and/or the connection may be physical or wireless in the illustrative examples.

In some illustrative embodiments, program code 218 may be downloaded over a network to persistent storage 208 from another device or data processing system through computer readable signal media 226 for use within data processing system 200. For instance, program code stored in a computer readable storage media in a server data processing system may be downloaded over a network from the server to data processing system 200. The data processing system providing program code 218 may be a server computer, a client computer, or some other device capable of storing and transmitting program code 218.

The different components illustrated for data processing system 200 are not meant to provide architectural limitations to the manner in which different embodiments may be implemented. The different illustrative embodiments may be implemented in a data processing system including components in addition to or in place of those illustrated for data processing system 200. Other components shown in FIG. 2 can be varied from the illustrative examples shown. The different embodiments may be implemented using any hardware device or system capable of executing program code. As one example, data processing system 200 may include organic components integrated with inorganic components and/or may be comprised entirely of organic components excluding a human being. For example, a storage device may be comprised of an organic semiconductor.

As another example, a storage device in data processing system 200 is any hardware apparatus that may store data. Memory 206, persistent storage 208, and computer readable media 220 are examples of storage devices in a tangible form.

In another example, a bus system may be used to implement communications fabric 202 and may be comprised of one or more buses, such as a system bus or an input/output bus. Of course, the bus system may be implemented using any suitable type of architecture that provides for a transfer of data between different components or devices attached to the bus system. Additionally, a communications unit may include one or more devices used to transmit and receive data, such as a modem or a network adapter. Further, a memory may be, for example, memory 206 or a cache such as found in an interface and memory controller hub that may be present in communications fabric 202.

The different advantageous embodiments recognize and take into account a number of different considerations. For example, the different advantageous embodiments recognize and take into account that current methods for imaging device configuration involve manual processes performed by human technicians. Internet Protocol (IP) addresses are reserved and submitted to human installers via service requests, which the installers then manually enter into the imaging devices. End users must wait up to several hours or longer to use an imaging device as the new device is being installed and configured. TCP/IP and DNS configuration is manually performed by human technicians as well.

When a new imaging device is installed, networking information for the new device is often manually configured by a human technician. The technician responsible for the installation of a new device may have to coordinate with a number of other human personnel to access different components of the configuration information needed to properly insert the new device into the appropriate network. This effort is time consuming and in the meantime an end user is unable to use the imaging device for its intended purpose.

Thus, the different advantageous embodiments further provide a method for dynamically configuring an imaging device. A request is received from an imaging device at a server. An offer is generated by the server having an IP address, IP address lease, subnet mask, a pair of dynamic name servers (DNS) and gateway. The offer is transmitted to the imaging device. An acceptance of the offer is received from the imaging device.

The different advantageous embodiments further provide a method for device management. An imaging device is detected using a dynamic host configuration protocol server. An IP address is selected for the imaging device. An IP address lease is assigned to the IP address for the imaging device. The imaging device's host name is placed into the domain name server. The IP address lease and domain name for the imaging device is recorded in an IP database. An asset tag is applied to the imaging device. The imaging device is assigned a device name using the asset tag applied. The IP address, asset tag and the device domain name are recorded in a database.

The different advantageous embodiments further provide a dynamic configuration system comprising a number of networks, a number of imaging devices, and a dynamic host configuration protocol server. The dynamic host configuration protocol server is configured to execute a dynamic configuration process to place the number of imaging devices into the number of networks.

The different advantageous embodiments further provide a computer program product stored on a computer recordable medium for dynamically configuring an imaging device. The computer program product comprising computer usable program code for receiving a request from an imaging device at a server. An offer is generated by the server having an IP address, IP address lease, subnet mask, a pair of dynamic name servers (DNS) and gateway. The offer is transmitted to the imaging device. An acceptance of the offer is received from the imaging device. The imaging device is bound to the configuration information of the offer. The accepted offer data is stored in a database.

Figure 3:
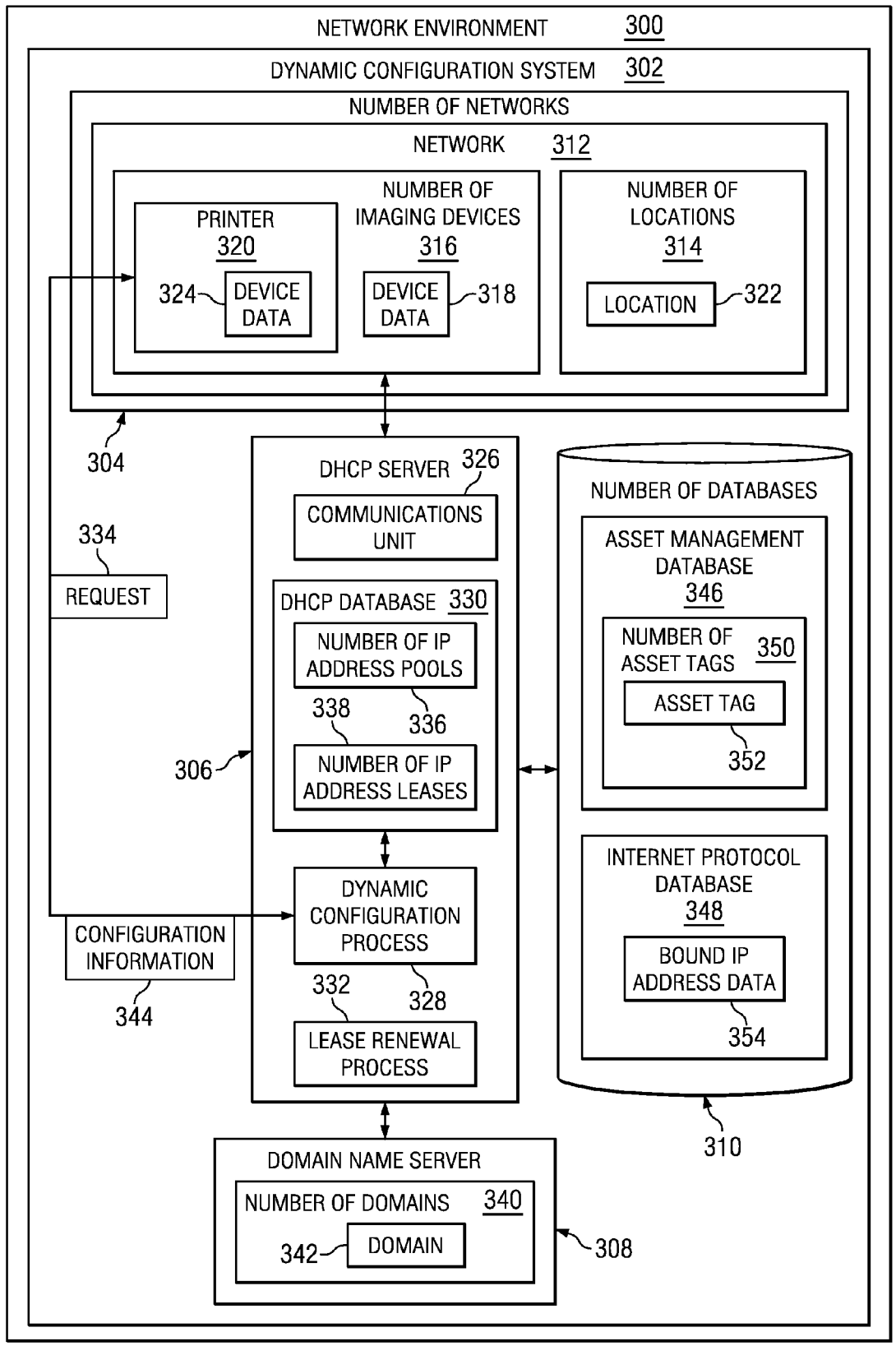
FIG. 3 is an illustration of a network environment in accordance with an advantageous embodiment.

With reference now to FIG. 3, an illustration of a network environment is depicted in accordance with an advantageous embodiment. Network environment 300 may be an illustrative example of an environment in which network 102 in FIG. 1 is implemented.

Network environment 300 includes dynamic configuration system 302. Dynamic configuration system 302 may include number of networks 304, dynamic host configuration protocol (DHCP) server 306, domain name server 308, and number of databases 310. Number of networks 304 may be an illustrative example of one implementation of network 102 in FIG. 1. As used herein, number of refers to one or more networks.

Network 312 is an illustrative example of number of networks 304. Network 312 includes number of locations 314 and number of imaging devices 316. Number of locations 314 may be any specific position or point in physical space where number of imaging devices 316 may be located. Number of imaging devices 316 may be any type of hardware device capable of generating images. Number of imaging devices 316 may be, for example, without limitation, a printer, scanner, copier, facsimile machine, and/or any other suitable imaging device.

Each device in number of imaging devices 316 includes device data 318. Device data 318 may be information such as, for example, without limitation, manufacturer, type, model, serial number, and/or any other suitable information about number of imaging devices 316.

In an illustrative example, device data may be, without limitation, formatted as: Mfg=LEXMARK; Typ=Printer; Mod=Lexmark C772; Ser=940P1RP. In this illustrative example, device data provides information on the manufacturer, type, model, and serial number of an imaging device. Device data 318 may be transmitted to dynamic host configuration protocol (DHCP) server 306 when number of imaging devices 316 is installed and/or powered on. The dynamic host configuration protocol is a computer networking protocol used by hosts, or DHCP clients, to retrieve internet protocol (IP) address assignments and other configuration information. Dynamic host configuration protocol (DHCP) server 306 is a server process that receives device data 318 and provides configuration information to number of imaging devices 316. Dynamic host configuration protocol (DHCP) server 306 may execute on a processor unit, such as processor unit 204 in FIG. 2. Printer 320 is an illustrative example of one implementation of number of imaging devices 316. Printer 320 may be powered on in location 322 of number of locations 314, for example. Device data 324 for printer 320 may be automatically transmitted to DHCP server 306 when printer 320 is powered on.

Dynamic configuration system 302 includes a client-server architecture, where number of imaging devices 316 is the number of clients and DHCP server 306 is the server. Number of imaging devices 316, the client, sends a broadcast request for configuration information when powered on. DHCP server 306 receives the request and responds with configuration information from its configuration database.

DHCP server 306 includes communications unit 326, dynamic configuration process 328, DHCP database 330, and lease renewal process 332. Communications unit 326 may be an illustrative example of one implementation of communications unit 210 in FIG. 2. Dynamic configuration process 328 receives configuration requests from number of imaging devices 316 and dynamically configures and places number of imaging devices 316 into number of networks 304. DHCP database 330 includes number of internet protocol (IP) address pools 336 and number of internet protocol (IP) address leases 338. Number of IP address pools 336 and number of IP address leases 338 are used by dynamic configuration process 328 to configure and place number of imaging devices 316 into number of networks 304.

Domain name server 308 is a name-service protocol that maps a human-recognizable identifier, referred to as a domain name, to a corresponding numeric internet protocol (IP) address. Domain name server 308 includes number of domains 340. Domain 342 is an illustrative example of one implementation of number of domains 340.

In an illustrative example, printer 320 sends request 334 to DHCP server 306. Request 334 is received by dynamic configuration process 328. Dynamic configuration process 328 accesses domain name server 308 to dynamically place printer 320 into the selected domain. In this illustrative example, dynamic configuration process 328 places printer 320 into domain 342.

Dynamic configuration process 328 accesses DHCP database 330 to identify an available IP address from number of IP address pools 336, and assigns the longest available IP address lease from number of IP address leases 338 to the IP address selected for printer 320. Dynamic configuration process 328 also accesses number of database 310 to identify an asset tag for printer 320. The selected domain 342, IP address, IP address lease, and asset tag information is then transmitted as configuration information 344 to printer 320. Printer 320 accepts configuration information 344 and is placed in network 312 and accessible to end users via network 312.

Number of databases 310 includes asset management database 346 and internet protocol database 348. Asset management database 346 is authorized as a read-only database to dynamic configuration process 328. Asset management database 346 includes number of asset tags 350. Number of asset tags 350 is an internal property identification number assigned by the company associated with network environment 300. Number of asset tags 350 is used by dynamic configuration process 328 to implement a dynamic standard naming convention to number of imaging devices 316 within network environment 300. Number of asset tags 350 facilitates device location information. Notification of installation of an imaging device and its physical location may be communicated to print queue management. Print queue management manages print requests in network environment 300. In an illustrative example, dynamic configuration process 328 identifies asset tag 352 for printer 320 and applies asset tag 352 to printer 320 as its authoritative device name. Dynamic configuration process 328 binds asset tag 352 to printer 320 to preserve a standard naming convention across all devices within network environment 300.

Internet protocol database 348 allocates IP addresses to number of networks 304 and DHCP server 306. For example, number of IP address pools 336 in DHCP database 330 is allocated by internet protocol database 348, as IP addresses are assigned and the pool needs to be replenished. Internet protocol database 348 also maintains records of IP addresses bound to an asset, or device, in bound IP address data 354. An asset is bound to an IP address when the IP address is allocated to the asset and the asset accepts the IP address. In an illustrative example, when printer 320 is bound to an IP address by dynamic configuration process 328, dynamic configuration process 328 records the IP address associated with printer 320 in bound IP address data 354 of internet protocol database 348.

DHCP server 306 also includes lease renewal process 332. Dynamic configuration process 328 assigns the longest available lease to an imaging device, such as printer 320. In one illustrative example, the longest available lease may be, without limitation, ten days. In this illustrative example, DHCP server 306 is configured to send, along with the lease, the rebinding time. The rebinding time provides the device with the information about when to renew IP address leases. In an illustrative example, the rebinding time may be a half-life cycle. For example, with a ten day lease, printer 320 is prompted by its own timers, to renew the IP address lease on day five. If printer 320 is still actively using the IP address, the lease renews for another ten days, in this illustrative example. In one illustrative example, with the knowledge that the device is a printer, which is a stationary device, the longest lease may be assigned. Assigning the longest lease reduces excessive lease renewals and traffic to the DHCP server.

The illustration of network environment 300 in FIG. 3 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, in one advantageous embodiment, some clients can assert different identifiers that indicate mobile devices and test equipment that typically do not reside on the network for long periods and can be offered short leases.

Figure 4:
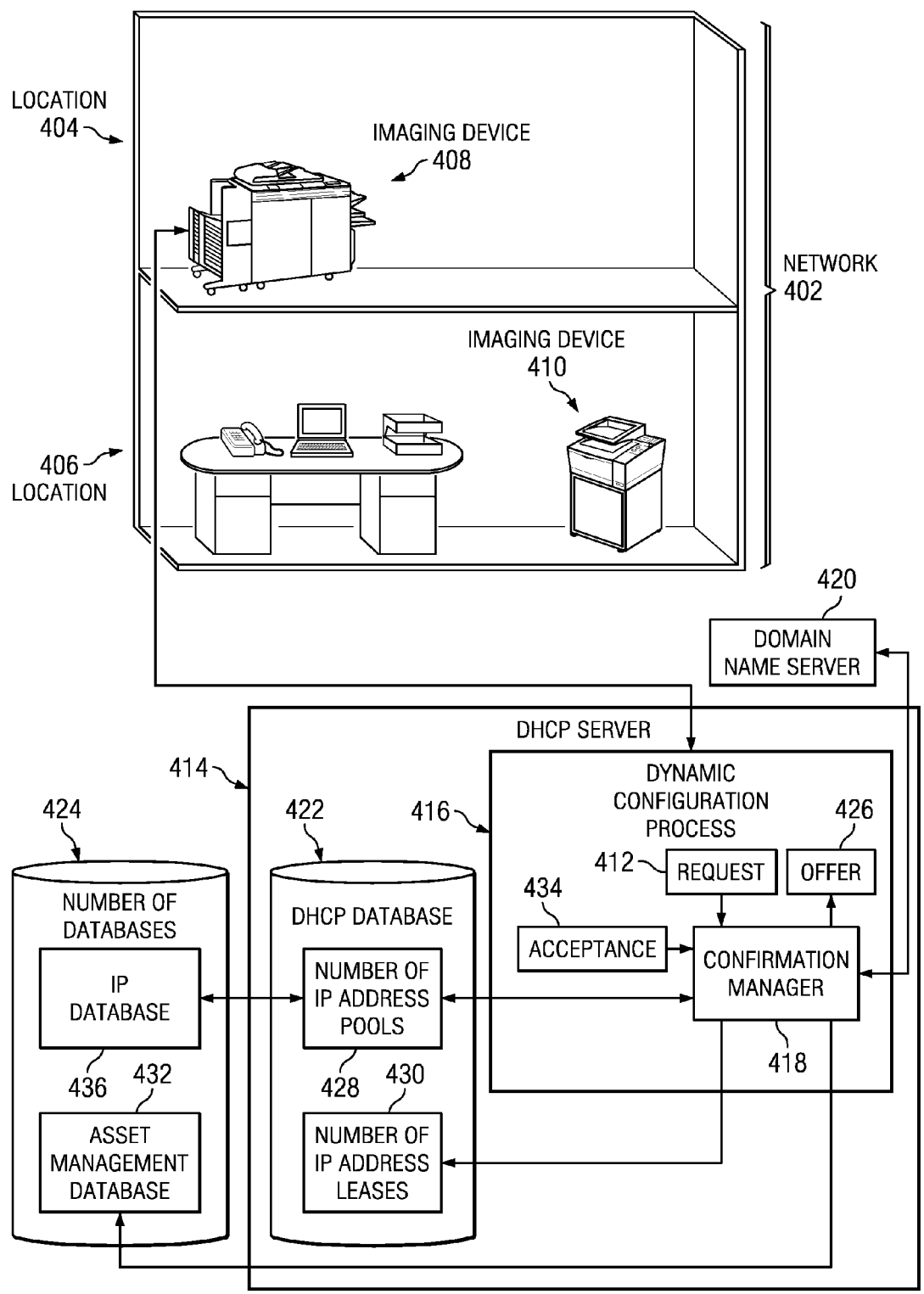
FIG. 4 is an illustration of a dynamic configuration system in accordance with an advantageous embodiment.

With reference now to FIG. 4, an illustration of a dynamic configuration system is depicted in accordance with an advantageous embodiment. Dynamic configuration system 400 is an illustrative example of one implementation of dynamic configuration system 302 in FIG. 3.

In this illustrative example, network 402 may include location 404 and location 406. Imaging device 408 may be implemented at location 404 and imaging device 410 may be implemented at location 406. In an illustrative example, imaging device 408 may be a newly installed device. Imaging device 408 is powered on and sends request 412 to DHCP server 414. Request 412 is received by dynamic configuration process 416. Dynamic configuration process 416 detects imaging device 408 using request 412. Dynamic configuration process 416 includes configuration manager 418. Configuration manager 418 identifies imaging device 408 using request 412, and interacts with domain name server 420, DHCP database 422, and number of databases 424 to generate offer 426.

Offer 426 includes a domain name from domain name server 420, an IP address from number of IP address pools 428, an IP address lease from number of IP address leases 430, and an asset tag from asset management database 432. Offer 426 is a data structure used to transmit configuration information to imaging device 408. Imaging device accepts offer 426, and acceptance 434 is received by dynamic configuration process 416. Once imaging device 408 accepts offer 426, imaging device 408 is accessible to end users over network 402. Dynamic configuration process 416 uses acceptance 434 to record the IP address associated with imaging device 408 in IP database 436. The asset tag for the imaging device 408 is identified using device data, such as device data 318 in FIG. 3, received in request 412. In an illustrative example, the asset tag number becomes the authoritative device name for imaging device 408, which preserves a standard naming convention.

The illustration of dynamic configuration system 400 in FIG. 4 is not meant to imply physical or architectural limitations to the manner in which different advantageous embodiments may be implemented. Other components in addition to and/or in place of the ones illustrated may be used. Some components may be unnecessary in some advantageous embodiments. Also, the blocks are presented to illustrate some functional components. One or more of these blocks may be combined and/or divided into different blocks when implemented in different advantageous embodiments.

For example, any number of networks in any number of locations may be implemented with dynamic configuration system 400. In another advantageous embodiment, location 404 and/or location 406 may have any number of imaging devices connected to the network and configured using dynamic configuration system 400.

Figure 5:
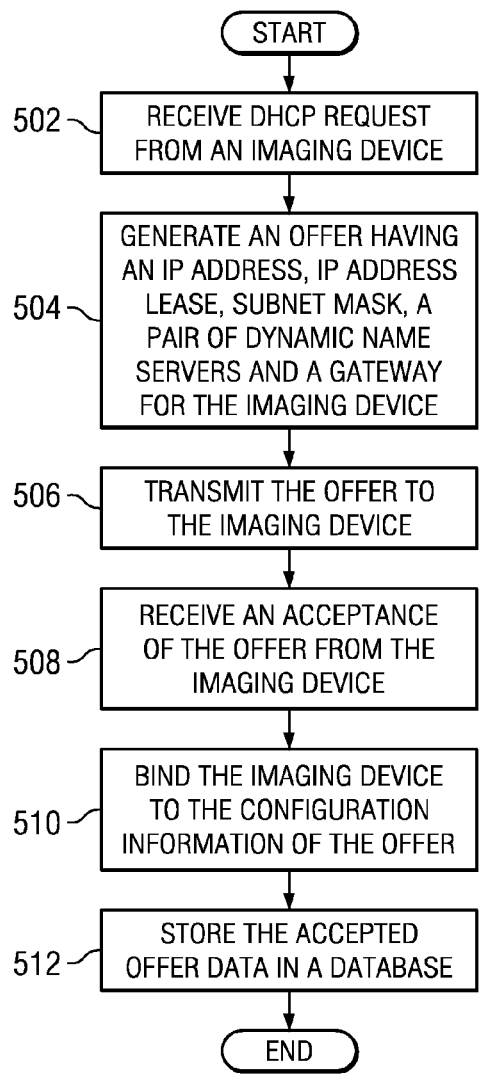
FIG. 5 is a flowchart illustrating a process for dynamically configuring an imaging device in accordance with an advantageous embodiment.

With reference now to FIG. 5, a flowchart illustrating a process for dynamically configuring an imaging device is depicted in accordance with an advantageous embodiment. The process in FIG. 5 may be implemented by a component such as dynamic configuration process 328 in FIG. 3 and/or dynamic configuration process 416 in FIG. 4, for example.

The process begins by receiving a DHCP request from an imaging device (operation 502). The imaging devices may be, for example, without limitation, a printer, scanner, copier, facsimile machine, and/or any other suitable imaging device. The process generates an offer having an IP address, IP address lease, and configuration information for the imaging device (operation 504). The IP address lease may be generated for an IP address selected for the imaging device, for example. The configuration information may include, for example, without limitation, a subnet mask, pair of dynamic name servers, gateway, domain name, asset tag name, and/or any other suitable configuration information. The domain name may be selected from a domain name server. The asset tag may be identified using the device data, such as device data 318 in FIG. 3, against an asset management database, such as asset management database 346 in FIG. 3, for example. The device name may be applied using the asset tag identified.

The process then transmits the offer to the imaging device (operation 506). The offer provides the configuration information and IP address assignment to the imaging device. The process receives an acceptance of the offer from the imaging device (operation 508). The process binds the imaging device to the configuration information of the offer (operation 510). The imaging device is bound to the asset tag of the offer upon acceptance of the offer so that an internal system naming convention can easily identify imaging devices in the network. The process then stores the accepted offer data in a database (operation 512), with the process terminating thereafter.

Figure 6:
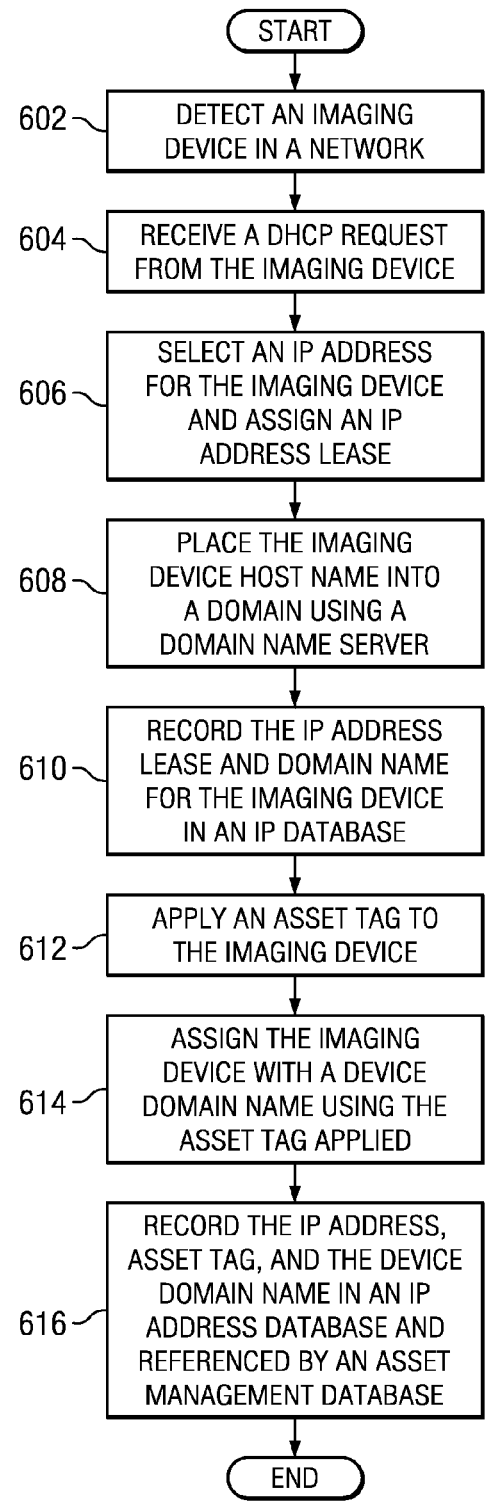
FIG. 6 is a flowchart illustrating a process for device management in accordance with an advantageous embodiment.

With reference now to FIG. 6, a flowchart illustrating a process for device management is depicted in accordance with an advantageous embodiment. The process in FIG. 6 may be implemented by a component such as dynamic configuration system 302 in FIG. 3 and/or dynamic configuration system 400 in FIG. 4, for example.

The process begins by detecting an imaging device in a network (operation 602). The imaging device may be detected by a dynamic host configuration protocol server. The process receives a DHCP request from the imaging device (operation 604). The DHCP request may be automatically transmitted to the dynamic host configuration protocol server by the imaging device when the device is powered on, for example. The process selects an IP address for the imaging device and assigns an IP address lease (operation 606). The IP address may be selected from a pool of addresses allocated to the dynamic host configuration protocol server, such as number of IP address pools 336 in FIG. 3, for example. The IP address lease assigned may be the longest available lease in number of IP address leases 338 in FIG. 3, for example. The process then places the imaging device host name into a domain using a domain name server (operation 608). The domain name is associated with the IP address selected for the imaging device.

The process records the IP address lease and domain name for the imaging device in an IP database (operation 610). The IP database may be, for example, IP database 348 in FIG. 3. The process applies an asset tag to the imaging device (operation 612). The asset tag for the imaging device may be identified using an asset management database, such as asset management database 346 in FIG. 3, for example. The process assigns the imaging device with a device domain name using the asset tag applied (operation 614). The process then records the IP address, asset tag, and the device domain name in an IP address database referenced by an asset management database (operation 616), with the process terminating thereafter. The asset management database is authoritative for asset tags. If the asset management database needs IP information about an asset, the asset management database is capable of querying the IP address database using the asset number as a lookup.

The flowcharts and block diagrams in the different depicted embodiments illustrate the architecture, functionality, and operation of some possible implementations of apparatus, methods and computer program products. In this regard, each block in the flowchart or block diagrams may represent a module, segment, or portion of computer usable or readable program code, which comprises one or more executable instructions for implementing the specified function or functions. In some alternative implementations, the function or functions noted in the block may occur out of the order noted in the figures. For example, in some cases, two blocks shown in succession may be executed substantially concurrently, or the blocks may sometimes be executed in the reverse order, depending upon the functionality involved.

The different advantageous embodiments can take the form of an entirely hardware embodiment, an entirely software embodiment, or an embodiment containing both hardware and software elements. Some embodiments are implemented in software, which includes but is not limited to forms, such as, for example, firmware, resident software, and microcode.

Furthermore, the different embodiments can take the form of a computer program product accessible from a computer usable or computer readable medium providing program code for use by or in connection with a computer or any device or system that executes instructions. For the purposes of this disclosure, a computer usable or computer readable medium can generally be any tangible apparatus that can contain, store, communicate, propagate, or transport the program for use by or in connection with the instruction execution system, apparatus, or device.

The computer usable or computer readable medium can be, for example, without limitation an electronic, magnetic, optical, electromagnetic, infrared, or semiconductor system, or a propagation medium. Non limiting examples of a computer readable medium include a semiconductor or solid state memory, magnetic tape, a removable computer diskette, a random access memory (RAM), a read-only memory (ROM), a rigid magnetic disk, and an optical disk. Optical disks may include compact disk-read only memory (CD-ROM), compact disk-read/write (CD-R/W) and DVD.

Further, a computer usable or computer readable medium may contain or store a computer readable or usable program code such that when the computer readable or usable program code is executed on a computer, the execution of this computer readable or usable program code causes the computer to transmit another computer readable or usable program code over a communications link. This communications link may use a medium that is, for example without limitation, physical or wireless.

A data processing system suitable for storing and/or executing computer readable or computer usable program code will include one or more processors coupled directly or indirectly to memory elements through a communications fabric, such as a system bus. The memory elements may include local memory employed during actual execution of the program code, bulk storage, and cache memories which provide temporary storage of at least some computer readable or computer usable program code to reduce the number of times code may be retrieved from bulk storage during execution of the code.

Input/output or I/O devices can be coupled to the system either directly or through intervening I/O controllers. These devices may include, for example, without limitation to keyboards, touch screen displays, and pointing devices. Different communications adapters may also be coupled to the system to enable the data processing system to become coupled to other data processing systems or remote printers or storage devices through intervening private or public networks. Non-limiting examples are modems and network adapters are just a few of the currently available types of communications adapters.

The different advantageous embodiments recognize and take into account a number of different considerations. For example, the different advantageous embodiments recognize and take into account that current methods for imaging device configuration involve manual processes performed by human technicians. IP addresses are reserved and submitted to human installers via service requests, which the installers then manually enter into the imaging devices. End users must wait up to several hours or longer to use an imaging device as the new device is being installed and configured. TCP/IP and DNS configuration is manually performed by human technicians as well.

When a new imaging device is installed, networking information for the new device is often manually configured by a human technician. The technician responsible for the installation of a new device may have to coordinate with a number of other human personnel to access different components of the configuration information needed to properly insert the new device into the appropriate network. This effort is time consuming and in the meantime an end user is unable to use the imaging device for its intended purpose.

Thus, the different advantageous embodiments provide a system and method that automatically detects, configures, and places a networked imaging device into network infrastructure systems in real time. The DHCP server can detect an imaging device using a tailored DHCP conversation, send the imaging device a long IP address lease, and dynamically place the printer into the domain name system. These transactions are automatically recorded into a database system and standard naming conventions are applied.

The description of the different advantageous embodiments has been presented for purposes of illustration and description, and is not intended to be exhaustive or limited to the embodiments in the form disclosed. Many modifications and variations will be apparent to those of ordinary skill in the art. Further, different advantageous embodiments may provide different advantages as compared to other advantageous embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A method for dynamically configuring an imaging device, the method comprising:
    receiving a request having device data directly from an imaging device at a processor unit, wherein the request is automatically transmitted to the processor unit when the imaging device is powered on;
    detecting the imaging device by the processor unit when the request is received from the imaging device;
    generating in real time, by the processor unit, an offer having an IP address, IP address lease, and configuration information using the device data for the imaging device;
    accessing a domain name server and placing a domain name for the imaging device in the domain name server, the domain name comprising a human readable domain name based on the device data;
    transmitting the offer from the processor unit directly to the imaging device; and
    receiving an acceptance of the offer from the imaging device at the processor unit.

2. The method of claim 1 further comprising:
    binding the imaging device to the IP address of the offer.

3. The method of claim 1 further comprising:
    storing the accepted offer data in a database.

4. The method of claim 1, wherein the request is a dynamic host configuration protocol request.

5. The method of claim 1, wherein the device data is information comprising at least manufacturer, type, model, and serial number for the imaging device, and wherein the domain name includes this information.

6. The method of claim 1, wherein the imaging device is selected from at least one of a printer, scanner, copier, and facsimile machine.

7. The method of claim 1, wherein the IP address lease is a longest available lease from the server.

8. A method for device management, the method comprising:
- an imaging device automatically transmitting a request directly to a dynamic host configuration protocol server when the imaging device is powered on, the request including device data comprising at least manufacturer, model, and serial number;
- responsive to receiving the request from the imaging device, detecting an imaging device using a dynamic host configuration protocol server executing on a processor unit;
- selecting an IP address for the imaging device;
- assigning an IP address lease to the IP address for the imaging device;
- selecting with a domain name server a domain name for the imaging device based on the device data, the domain name comprising a human readable name including the manufacturer, model, and serial number;
- placing the imaging device host name into a domain name server;
- recording the IP address lease and domain name for the imaging device in an IP database;
- applying an asset tag to the imaging device, the asset tag comprising a property identification number;
- assigning the imaging device with a device domain name using the asset tag applied; and
- recording the IP address, the asset tag, and the device domain name in a database.

9. The method of claim 8, wherein the IP address selected for the imaging device is selected from a pool of IP addresses allocated to the dynamic host configuration protocol server.

10. The method of claim 8, wherein the IP address lease assigned is the longest available lease in a number of IP address leases.

11. The method of claim 8, wherein the domain name is associated with the IP address selected for the imaging device.

12. A dynamic configuration system comprising:
- a number of networks;
- a number of imaging devices, at least one imaging device configured to send a request when the imaging device is powered on, the request including device data comprising at least a serial number;
- a dynamic host configuration protocol server configured to execute a dynamic configuration process to place the number of imaging devices into the number of networks, the dynamic host configuration protocol server directly receiving the request from the imaging device, and wherein the dynamic host configuration protocol server further executes the dynamic configuration process to select an IP address for the imaging device, assign an IP address lease to the imaging device, place the imaging device into a domain, identify an asset tag for the imaging device using the device data, and bind the asset tag for the imaging device to a device name for the imaging device; and
- a domain name server having a number of domains, wherein the dynamic configuration protocol server places the number of imaging devices into the number of domains, the domain name server further configured to select device names for the number of imaging devices, each device name comprising a human readable name based on the device data and including at least the serial number.

13. The dynamic configuration system of claim 12 further comprising:
- an asset management database having a number of asset tags; and
- an internet protocol database configured to allocate a number of IP addresses and maintain bound IP address data.

14. The dynamic configuration system of claim 12, wherein the number of networks are implemented in a network environment.

15. The dynamic configuration system of claim 12, wherein the number of imaging devices are selected from at least one of a printer, scanner, copier, and facsimile machine.

16. The dynamic configuration system of claim 12, wherein the number of imaging devices are accessible to a number of end users over the number of networks after the dynamic configuration process places the number of imaging devices into the number of networks.

* * * * *